(12) United States Patent
Crassous

(10) Patent No.: US 9,802,371 B2
(45) Date of Patent: Oct. 31, 2017

(54) APPARATUS FOR MOLDING COMPOSITE MATERIALS

(75) Inventor: Dominique Crassous, Nice (FR)

(73) Assignee: H-PREC SAS, Carros (FR)

( * ) Notice: Subject to any disclaimer, the term of this patent is extended or adjusted under 35 U.S.C. 154(b) by 828 days.

(21) Appl. No.: 13/881,293

(22) PCT Filed: Oct. 25, 2011

(86) PCT No.: PCT/FR2011/000571
§ 371 (c)(1),
(2), (4) Date: Apr. 24, 2013

(87) PCT Pub. No.: WO2012/056122
PCT Pub. Date: May 3, 2012

(65) Prior Publication Data
US 2013/0221583 A1 Aug. 29, 2013

(30) Foreign Application Priority Data
Oct. 28, 2010 (FR) ..................... 10 04233

(51) Int. Cl.
| | | |
|---|---|---|
| *B29C 70/44* | (2006.01) | |
| *B29C 33/38* | (2006.01) | |
| *B29C 33/40* | (2006.01) | |
| *B29C 70/54* | (2006.01) | |
| *B29C 43/12* | (2006.01) | |
| *B29C 43/36* | (2006.01) | |

(52) U.S. Cl.
CPC .......... *B29C 70/44* (2013.01); *B29C 33/3814* (2013.01); *B29C 33/405* (2013.01); *B29C 70/542* (2013.01); *B29C 43/12* (2013.01); *B29C 70/443* (2013.01); *B29C 2043/3647* (2013.01)

(58) Field of Classification Search
CPC ....... B29C 70/44; B29C 70/443; B29C 43/12; B29C 43/3644; B29C 2043/3647; B29C 70/542; B29C 33/3814; B29C 33/405
USPC ......................................... 425/111, 389, 390
See application file for complete search history.

(56) References Cited

U.S. PATENT DOCUMENTS

| | | | |
|---|---|---|---|
| 5,108,532 A | | 4/1992 | Thein et al. |
| 5,322,665 A | * | 6/1994 | Bernardon .......... B29C 43/3642 156/285 |

(Continued)

FOREIGN PATENT DOCUMENTS

| | | |
|---|---|---|
| DE | 10 2004 025704 A1 | 12/2005 |
| EP | 0 410 599 A2 | 1/1991 |

(Continued)

OTHER PUBLICATIONS

International Search Report, dated Mar. 7, 2012, from corresponding PCT application.

*Primary Examiner* — Seyed Masoud Malekzadeh
(74) *Attorney, Agent, or Firm* — Young & Thompson

(57) ABSTRACT

A method and apparatus for shaping, compacting, and supporting a composite material (C) contained between two flexible membranes (G, F) and capable of being stretched over a porous mold (A) are described. The apparatus enables the use of inexpensive mold despite the high pressures used. A counter-mold (M) having the same characteristics as the mold can be used in certain instances. The equipment enables the use of a plurality of molds and counter-molds during one manufacturing cycle.

12 Claims, 3 Drawing Sheets

(56) References Cited

U.S. PATENT DOCUMENTS

| | | | | |
|---|---|---|---|---|
| 5,464,337 A | * | 11/1995 | Bernardon | B29C 33/302 264/257 |
| 5,578,158 A | * | 11/1996 | Gutowski | B29C 70/44 156/222 |
| 5,641,372 A | * | 6/1997 | Okuno | B41F 16/00 156/230 |
| 2004/0145092 A1 | | 7/2004 | McCollum et al. | |

FOREIGN PATENT DOCUMENTS

| | | |
|---|---|---|
| FR | 2 846 271 A1 | 4/2004 |
| WO | 00/53400 A1 | 9/2000 |
| WO | 2009/141592 A2 | 11/2009 |

* cited by examiner

APPARATUS FOR MOLDING COMPOSITE MATERIALS

BACKGROUND OF THE INVENTION

Field of the Invention

The apparatus described in this patent makes it possible to manufacture a moulded composite product and to hold it in shape for the time necessary for polymerisation of the matrix. It makes it possible to form, compress, maintain in shape and modify the temperature of a polymerisable-matrix composite contained between two flexible stretchable membranes. The features of this tool make it possible to mould a product without the composite being in contact with the mould and without any residual air pocket between the mould and the composite. In addition, the cost of the mould in this method is not exponential as a function of the pressing pressures and temperatures necessary for obtaining a high-quality composite. The apparatus that is the subject matter of the patent uses original technical solutions and allows a manufacturing cycle for the composite that affords responses to several problems recurrent during the manufacture of composite products with polymerisable matrix. The gains are significant in terms of working time, mould cost and quality of the finished product compared with the other known methods.

Description of the Related Art

This type of composite product is normally produced with presses in which metal or resin moulds are inserted. The cost and difficulty of producing the moulds as well as the expensive materials that make them up make the finished products expensive. The finish quality of the moulds determines the finish quality of the surface of the part and this increases the difficulty of manufacture and increases the cost. This type of production is mainly suitable for mass production. In the majority of methods, the composite is in direct contact with the mould and this requires operations of preparing and maintaining the mould between the manufacturing phases. The fitting of reinforcements, impregnated or not, requires a manual phase the control of which depends on the competence of the operator. Known control methods such as RTM (Resin Transfer Moulding) make it possible to produce parts quickly with consistent quality but make it impossible to compact the reinforcements, which prevents the manufacture of parts of high mechanical quality.

The manufacture of composite parts by lamination, infusion or injection in open moulds requires a perfect finish of the mould, the cost of which is in any event high. The long working time due to the numerous successive operations necessary for manufacturing the finished part increases the unit cost. This method is suitable for small series with very high added value. The repercussion of the tooling costs on the price of the parts is one of the reasons that make this method profitable for large-sized parts for which the moulding in a single operation represents a gain in productivity. The best known examples are those of hulls and decks of pleasure craft or polyester swimming pools.

Another category of tooling consists of membrane presses that compact and hold the composite on the mould, using the physical properties of a fluid. Whether it is a case of air during a simple setting under vacuum or a gas or a liquid in a closed chamber, the principle remains the same: the composite is in contact with the mould to which it is applied and pressed by the pressure of the fluid. The evacuation of air between the mould and the composite remains a problem to be solved for all the methods. The draping of reinforcement fabrics on the mould before or after impregnation by the matrix and the preparation of the mould itself remain lengthy and tricky operations. The autoclaves used in the majority of manufactures requiring optimum mechanical quality will be ranked in the category of membrane presses since the problems that they pose and the advantages that they afford are very similar.

SUMMARY OF THE INVENTION

An apparatus intended to form and compact a composite (C) contained between two flexible stretchable membranes (G, F) adherent or not to the composite (C) on a mould (A) and to hold it during the polymerisation of the matrix; the variation in pressure of the fluids in the top chamber (C) is the driver of this process; this apparatus is composed of a chassis (B) holding the membranes (G, F) and the mould (A) at their periphery and relative to each other, a top chamber (C), membranes (G, F) containing the composite (C), a mould (A), a bottom chamber (D) or a bottom plate (B) (FIG. 4) connected to the chassis (B) and supporting the mould (A) with a shape stability such that its deformation under the effect of the pressurisation of the top chamber (E) is less than the shape tolerance limits defined when the composite part (C) is designed; the pressure and temperature of the fluids can be regulated in the areas where the fluids circulate by means of suitable accesses and peripherals; the chamber (D) makes it possible to vary the pressure of a fluid on the bottom surface of the mould (A) and consequently to control the deformation of the mould (A) while the pressure of a fluid varies in the top chamber (E); the mould (A) consists of one or more materials resistant under compression to the pressure applied by the membrane (F) on the composite (C); this apparatus is characterised by the fact that the composite (C) is shaped on a mould (A), held at the periphery relative to the chassis (B), porous at least on the surface on which the composite (C) is conformed in order to eliminate any fluid contained between the mould (A) and the membrane (G) by pressure gradient when the composite (C) is conformed on the surface of the mould (A).

BRIEF DESCRIPTION OF THE DRAWING FIGURES

DETAILED DESCRIPTION OF THE INVENTION

Figure 1:
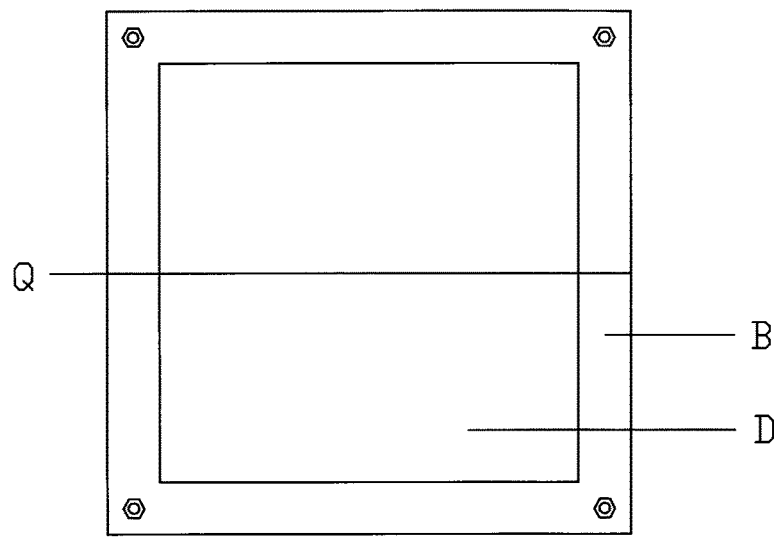
FIG. 1 is a view of the molding apparatus of the invention.
Figure 2:
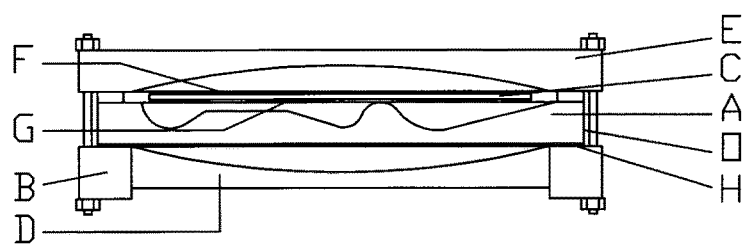
FIG. 2 is a cross sectional view of the molding apparatus of the invention.
Figure 3:
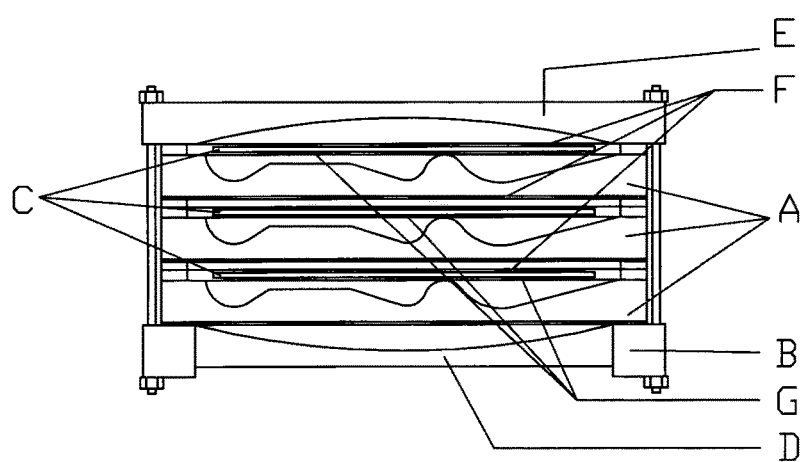
FIG. 3 is a cross sectional view of the molding apparatus of the invention.
Figure 4:
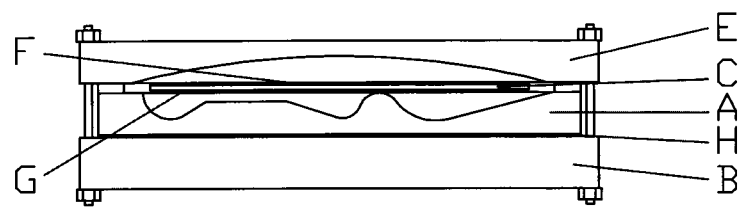
FIG. 4 is a cross sectional view of the molding apparatus of the invention.
Figure 5:
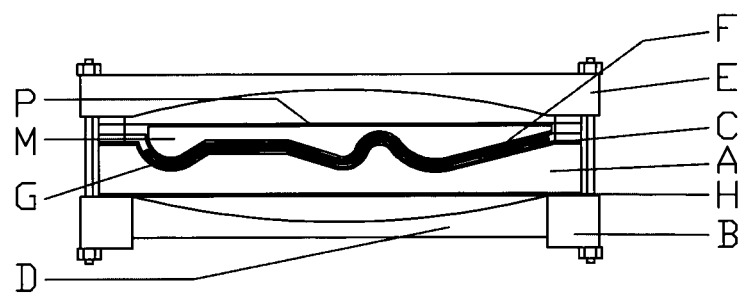
FIG. 5 is a cross sectional view of the molding apparatus of the invention.
Figure 6:
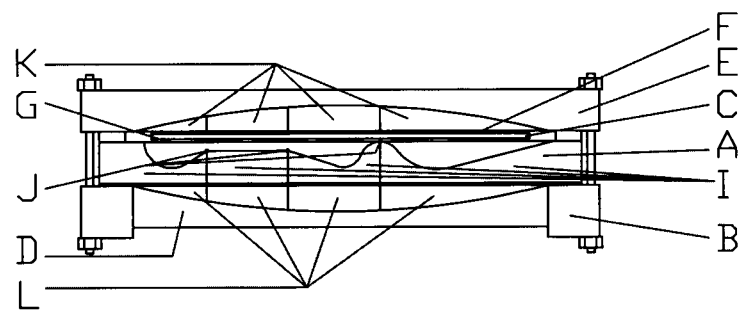
FIG. 6 is a cross sectional view of the molding apparatus of the invention.
Figure 7:
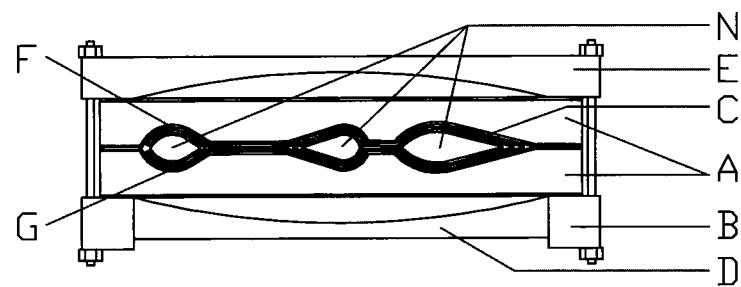
FIG. 7 is a cross sectional view of the molding apparatus of the invention.
Figure 8:
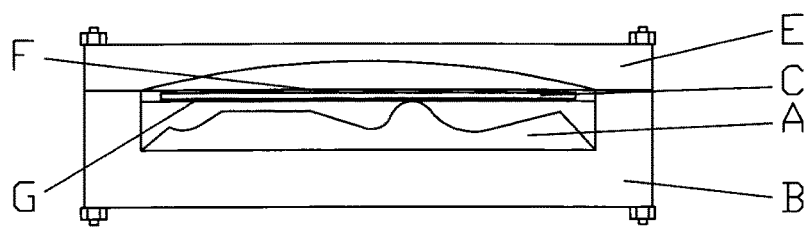
FIG. 8 is a cross sectional view of the molding apparatus of the invention.
Figure 9:
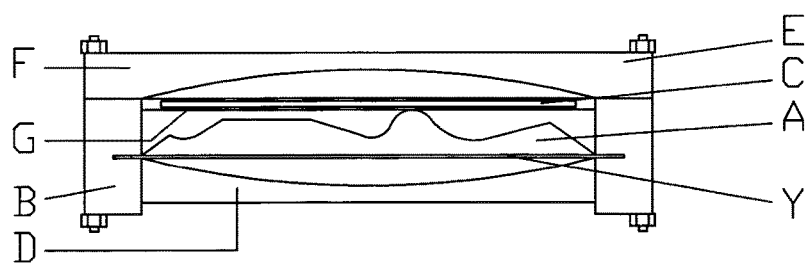
FIG. 9 is a cross sectional view of the molding apparatus of the invention.
Figure 10:
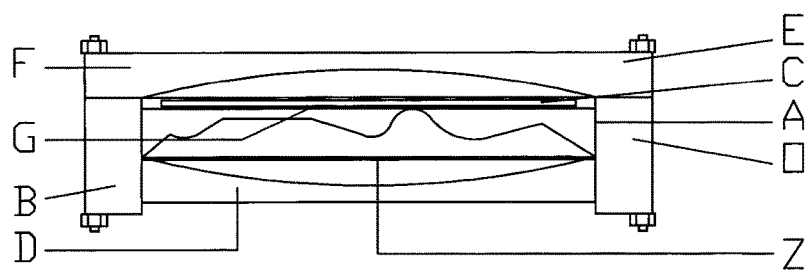
FIG. 10 is a cross sectional view of the molding apparatus of the invention.

The apparatus that is the subject matter of the patent (FIG. 1) seen in cross-section (Q) (FIG. 2 to FIG. 10) consists of a bottom chamber (D) and a top chamber (E) each disposed on either side of the mould (A) and held relative to a rigid chassis (B) enabling the peripheral part of the mould to be conformed during the pressing phase. The chassis (B) is sufficiently rigid and dimensionally stable to ensure that the area of the mould (A) held by the chassis will remain within the required shape tolerance limit throughout the manufacturing operation performed with the apparatus. The top (E) and bottom (D) chambers will have the ability to withstand the operating stresses of the apparatus but will be able to be supple or rigid provided that they will make it possible to obtain the required operating pressures. The airtightness of the bottom chamber (D) is achieved either by the insertion of a flexible membrane held at the periphery relative to the chassis (B) or by surface sealing of the bottom part of the mould (A) that thereby ensures the airtightness of the bottom chamber (D). The bottom chamber (D) may be omitted (FIG. 4) provided that the chassis (B) holds the mould (A) over its entire lower surface (FIG. 2) considering that the chassis (B) will ensure the holding of the mould (A) in the deformation limits fixed for the finished product, throughout the manufacturing phases, as well as, if necessary, the sealing of the part of the chassis (B) replacing the bottom chamber (D) of the apparatus.

The composite (C) is contained between two flexible stretchable membranes (G, F) impervious to the polymerisable matrix of the composite and adherent or not to the matrix of the composite and separating the chamber (E) from the mould (A). The composite elements (C) constituting the final part are contained between these two membranes (G, F). The membranes (G, F) may or may not be part of the final product. The membranes (G, F) are held at the periphery of the pressing chamber (E) so that the pressure of a fluid can be controlled in the areas around the membranes (G, F), on the chamber side (E) or the mould side (A). In this way, during the forming operation, the controlled progressive isobaric extension of all or part of the membranes (G, F) containing the composite (C) pushed by a fluid contained in the chamber formed between the membrane (F) and the chamber (E) in order to press them onto the mould (A) is done by limiting the risks of stray folds or deformations in the reinforcements of the composite (C) or on the surface of the membranes (G, F). In this case, the deformation of the fibres of the reinforcement may be modelled and it is easier to calculate the mechanical characteristics of the finished composite material.

The membranes (G, F) used for containing the composite (C) and/or separating the areas in the apparatus may be composed of deformable flexible materials resistant to heat such as for example the silicone membranes designed for this use and employed in the majority of membrane presses. In the apparatus described in this patent, the membranes (G, F) may also be composed of inexpensive materials considered to be consumable. Certain stretchable flexible films have properties of deformation under pressure at certain temperatures which mean that they follow the shape of the mould (A), usually without the possibility of return to their initial shape after the end of the pressing operation, but keep their impermeability during the phases of pressing and polymerisation of the matrix.

The area between the membranes (G, F) containing the composite (C) is closed or not depending on the way in which the composite (C) will be manufactured. The composite (C) may be manufactured, between the membranes (G, F), by all traditional methods. The method used may for example be: lamination by manual application of matrix to a reinforcement, with putting the result under vacuum or not; manual draping of pre-impregnated fabric; infusion or injection of matrix in a reinforcement, before or after shaping of the reinforcement, and more generally any type of method provided only that this construction is effected between the two flexible stretchable membranes (G, F). The composite (C) contained between the two membranes (G, F) is formed on a mould (A) as would be a metal sheet in a hydroforming method or between a mould and a countermould like a metal sheet in a drawing press. The composite (C) is then held in shape by the pressurised fluid contained by the chamber (E) against the membrane (F), for the time necessary for polymerisation of the matrix until a piece conformed to the mould (A) and dimensionally stable is obtained.

The main features of the mould (A) are the ability of the materials constituting it to withstand the pressure of the fluids in the chamber of the apparatus and a surface porosity at least on the surfaces where the piece is formed.

The pressure of a fluid in the top chamber (E) conforms the membranes (G, F) containing the composite (C) to the surface of the mould (A). The porosity of the mould (A) makes it possible to shape the membranes (G, F) and the composite (C) that they contain against the surface of the mould without its being necessary to provide vents in the mould. The air may be driven from the area (L) between the membrane (G) and the mould (A) by the pressure gradient between the inside of the area (L) and the outside. Putting the area (L) lying between the mould (A) and the membrane (G) under vacuum can be done completely whatever the shape of the part provided that the periphery of the mould has been closed and provided that it has been equipped with accessories allowing the use of a vacuum pump for putting the area (L) under vacuum. No air pocket can in this way be trapped between the mould (A) and the membrane (G) containing the composite (C) in contact with the mould during the forming phase.

The surface porosity of the mould (A) also makes it possible to vary at any time and homogeneously the pressure of a fluid between the mould (A) and the membrane (G) in contact with the mould (A).

By virtue of the surface porosity of the mould (A), removing the part (E) from the mould once formed can be done by putting the area (L) between the mould (A) and the membrane (G) in contact with the mould (A) under overpressure. The surface porosity of the mould (A) makes it possible to distribute the pressure over the membrane (G) evenly and thus, at the time of extraction, to prevent the inevitable delaminations if the mechanical properties of the composite (C) are not yet optimum.

The mould (A) can be produced from numerous materials having the two characteristics mentioned above, that is to say: surface porosity and resistance to the operating pressure and temperature of the apparatus.

In practice, the mould (A) can be produced, on the surface or in its entirety, from inexpensive materials such as porous foams or wooden agglomerates or consist of a material covered with a surface treatment enabling a fluid to be drained towards the outside of the surface on which the composite (C) is formed.

Areas in the apparatus are delimited by the membranes (G, F), the chamber and the mould (A). In these areas, the type of fluid and their pressure and temperature can be controlled separately by means of access orifices and a set of suitable peripherals.

During the pressing operation, the mould (A) is stressed on its top and bottom faces by the actions of the fluids contained in the chambers (D, E) or stressed on its top face by reaction of the fluid in the top chamber (E) on the membrane (F) and held on its bottom face by a rigid support (B) secured to the holding chassis (B).

When the mould (A) is held by the chassis (B) between the top (E) and bottom (D) chambers of the apparatus and fluids apply a pressure to its top and bottom surfaces, the pressures can be controlled on these two faces of the mould (A) while its periphery is held to a predefined shape by the chassis (B) of the apparatus. In this way a high structural rigidity is no longer a major parameter when the mould (A) is designed since it is possible to control its deformation between the periphery and centre by modifying the pressures of the fluids contained in the top (E) and bottom (D) chambers.

In this tool, considering the rigidity of the chassis (B) that holds the periphery of the mould (A), the pressure applied to the mould (A) can be broken down into two components.

The first is the resultant of all the forces normal to the plane formed by the chassis (B) of the apparatus holding the mould (A); these pressures can achieve equilibrium and in all cases their differential can be controlled by adjusting the pressures in the bottom (D) and top (E) chambers of the apparatus. For these forces, the resistance to deformation under pressure of the material or materials constituting the mould (A) is the only criterion that interests us.

The second is the horizontal resultant of the forces generated by the pressurisation of the fluids in the chambers (D, E). In the case of moulds having a large hollow, these forces parallel to the plane of the holding chassis (B) may be great and cause tractions in the mould (A) that may go as far as rupture of the material or materials constituting it. To solve this problem, the mould (A) will be provided with one or more reinforcements (H) parallel to the plane in which the chassis (B) holds the mould (A) in position, produced from a material withstanding the traction forces generated on it by the apparatus. These reinforcements (H), secured to the mould (A), can consist for example of fibre and resin composite plates or metal sheets. In this way, and because of the action of these reinforcements (H), the forces in the mould (A) can be broken down and summarised to compression forces on the faces opposite to the chambers (D, E) containing the fluids, to traction forces parallel to the plane in which the chassis (B) of the apparatus holds the mould. The latter forces are absorbed in traction in the reinforcement plane and in shearing in the material of the mould (A) situated in the areas held at the periphery of the mould by the chassis (B) of the apparatus.

The introduction, in the chambers (D, E), of non-compressible liquids corresponding to the exact theoretical volume of the cavities defined when the composite material (C) is conformed on the mould (A) makes it possible, when the liquids are pressurised, to guarantee the perfect conformation of the part on the mould (A). A non-compressible liquid used to manage the shaping of the composite (C) and to put the chambers (D, E) under pressure, also has the advantage of allowing the use of high working pressures without the system having an explosive risk, unlike autoclaves in which a large quantity of gas is pressurised. This simplifies accordingly the conformity of the apparatus to safety standards as well as control and maintenance thereof.

The pressure may vary independently in all the closed areas of the apparatus. In this way, the deformation of the membranes (G) and (F) containing the composite (C) can be controlled and optimised.

The importance of this function is due to the fact that the operation of forming the composite (C) will be performed differently depending on the shape of the mould (A) and therefore the force that it will cause the membranes (G) and (F) containing the composite to undergo during the phase of conformation of the composite (C) on the mould (A). The pressure in the chamber (E) may be high so as to compact the composite material (C) as much as possible before polymerisation of the matrix, reduce to a minimum the air or vacuum pockets included in the composite material (C) and optimise the positioning of the reinforcements with respect to each other as well as the positioning of all the materials constituting the composite (C) on the mould (A). This pressure is normally obtained in autoclave ovens by increasing the pressure of the air around the part to pressures of around 8 to 10 bar, which are normally used for mechanical parts intended to be highly stressed. These high-pressure chambers are very tricky and expensive to produce because of the explosive risk in the event of rupture of the chamber. In the apparatus that is the subject matter of the invention, the overpressure may be obtained by means of a fluid that is non-compressible in the liquid state, such as water or oil. This feature makes pressurisation easy and the high specific heat of some of these fluids makes it possible to obtain effective regulation of the temperature in the apparatus. In this way, the temperature can be kept low in order to block or retard the polymerisation of the matrix of the composite or increased in a regulated manner during the phase of polymerisation of the matrix. According to the required forming and curing temperatures, different fluids will be chosen. Several fluids can be used according to the applications or successive phases of the same manufacture (water as from 0° C. and more for forming and oil at more than 100° C. for curing for example).

Several moulds (A) (FIG. 3) with their sets of membranes (G) and (F) can be held on the same chassis (B) by keeping the same working functionalities for the apparatus as with a single mould (A). The only constraint consists of working with moulds (A) for which the working pressures are compatible.

Reference areas of fixed markings can be provided on the mould (A) so as to enable it to be placed in a normed reference frame. By means of these references and the surface porosity of the mould (A), the composite (C) obtained after conformation to the mould (A) and polymerisation of the matrix can be held in position by negative pressure on the mould (A), which is positioned on a numeric-controlled machining centre. The finishing machining can be carried out rapidly, under the best holding and precision conditions. The mould (A) can therefore serve alternately as a forming and supporting mould (A) for holding the formed part during machining thereof on a numeric-controlled machining centre. The mould (A) can also be used as a jig by holding a part by putting a vacuum on it while the matrix polymerises or other parts are assembled on the part thus held.

To keep the mould (A) in its initial shape during the working in the apparatus, two solutions can be used.

The first consists of putting the mould (A) in the apparatus so that, once the mould (A) is held at the periphery by the chassis (B) and before the chambers (D, E) are pressurised, the mould (A) has the required final form. Next, the deformation of the chambers (D, E) relative to the chassis (B), during pressurisation, will be identical on both sides of the mould (A) when the top (E) and bottom (D) chambers are at the same pressure. In this way, the increase in pressure in the apparatus will cause a variation in volume identical for the chambers (D, E) while the mould (A) remains fixed with respect to the chassis (B) of the apparatus.

The second solution consists of introducing a system for measuring the position of the mould (A) with respect to the chassis (B), making it possible at all times to know the position of certain reference points of the mould (A) with respect to the chassis (B), which constitutes the reference zone of the apparatus. By means of this system, it will be possible to vary the pressure separately in the top (E) and bottom (D) chambers so as to adjust the position of the mould (A) relative to the chassis (B) and therefore to its own peripheral area, which is held by this same chassis.

It is possible to separate the surface of the mould (A) (FIG. 6) on which the composite (C) is to be conformed into several areas by means of joints (J) making it possible to determine different areas (I) in which the fluid pressures can be regulated separately. The chamber (E) opposite the mould (A) can itself, if necessary, be compartmentalised opposite the separations of the areas (I) made in the mould. The same applies if necessary to the chamber (D) situated on the bottom face of the mould (A), which can be separated into distinct areas (L). This makes it possible to differentiate the forming or compacting pressures as required. This equipment also makes it possible to implement successive phases of putting under vacuum and compacting for the same mould (A). Equilibrium being obtained area by area on the top and bottom faces of the mould (A), this pressing operation with differentiated pressures can be obtained by controlling the deformations of the mould (A) as well as its position relative to the chassis (B).

To fabricate hollow parts (FIG. 7), it is possible to install moulds (A) not so as to effect separate superimposed fabrications as indicated above, but with the faces on which the composite (C) must be conformed opposite. The membranes (G) and (F) containing the composite (C) will be disposed in the apparatus between the two moulds (A). Flexible extensible pouches (N) will be disposed in the composite (C) contained between the two membranes (G) and (F). These pouches (N) will be equipped so that it is possible to introduce a fluid into each of them and to vary the pressure thereof conjointly or independently. After polymerisation and according to the access possibilities offered by the machined finished product to the areas containing the pouches (N), the pouches can either be removed from the finished product or left permanently inside this product. In this type of manufacture, the general operating principle of the apparatus remains identical to the principle described above.

By injecting foam or forming a polymerisable material between two membranes (G) and (F) that determine the form of the finished part, it is possible to fabricate a countermould (M) or a forming mould without passing through machining. The mouldings obtained by this method can serve as a countermould (M) (FIG. 5) for forming the composite (C) during the forming operation or to conform the parts once they have been brought out of the apparatus, provided that this is necessary, until the end of polymerisation of the matrix, which, depending on the type of matrix used and the temperature conditions, may range from a few minutes to several days.

In the case where a countermould (M) that is total or partial relative to the surface on which the composite (C) is to be conformed is used during the fabrication operation, it is contained in an area of the apparatus delimited firstly by the membrane (F) containing the composite (C) and secondly by a membrane (D) separating it from the chamber (E) of the apparatus. The pressure of the fluids in the area between these two membranes (F) and (G) and in the chamber (E) can be regulated separately. First the form of the countermould (M) is pushed by the pressure of the fluid contained in the top chamber (E) against the mould (A). If the situation remained as it was, the pressure would be maximum on the surfaces normal to the chamber (E) and in contact with the countermould (M) and zero on the surfaces perpendicular to the chamber. All the surfaces at intermediate angles would be stressed differently according to the angle and thickness of the composite (C). In the apparatus, the first shaping of the reinforcements or of the reinforcements and the non-polymerised matrix according to circumstances can be done by means of the countermould (M), which provides a first positioning. Secondly, a fluid, compressible or not, is introduced between the bottom (F) and top (P) membranes containing the countermould (M). Pressurisation of this fluid causes a homogeneous pressurisation of the membranes (F) and (G) containing the composite (C) against the mould (A) during the phase of polymerisation of the matrix as would be the case in an autoclave. This feature differentiates our method from the RTM (Resin Transfer Moulding) method. In RTM, the mould and the countermould are fixed and the quantity of matrix is determined as soon as the mould and countermould are closed. In our method, the pressurisation of the membrane (F) by means of a fluid affords compacting of the composite (C) and positioning of the fibres as well as optimisation of the quantity of matrix and reinforcements exactly as is the case in an autoclave.

In the case where the countermould (M) is used, the compacting of the composite (C) by means of the fluid contained between the membranes containing the countermould can generate a space between the countermould and the membrane (F) containing the composite. This space may be due to faulty optimisation of the compacting in the area in question or to a form of the mould (A) not allowing shaping during the translation of the countermould (M). In this case, and if it is necessary to give the finished part a precise dimension, it is possible to effect the first use of the composite (C) which will be formed, compacted and then polymerised until a second injection of resin is effected between the membrane (F) containing the composite situated on the same side as the countermould (M) and the composite already polymerised. Because of this the part of the piece obtained during the first phase will keep its mechanical properties and the final piece will be adjusted to the required shape in a single operation.

In the case where the matrix is applied in the reinforcement in the liquid state, that is to say in the case where pre-impregnated fabrics in which the ratio between reinforcement and matrix is optimised are not used, it is possible, in the apparatus described, after having obtained impregnation by infusion, injection or manual application of the matrix on the reinforcement, to effect a compacting as described above. After this phase, the main effect of which is to optimise the distribution and position of the matrix and reinforcement, it is possible, by opening the area between the membranes (F) and (G) containing the composite (C) either to the outside or to an area under high negative pressure with respect to the pressure established in the chambers (D, E) of the apparatus, to make some of the matrix, which would be in superabundant quantity, to flow towards this area external to the apparatus until a required ideal ratio between matrix and reinforcement is obtained. After this phase, the openings can be left open or closed again in order to resume the compacting of the composite (C) without risking causing another matrix to flow towards the outside of the apparatus.

The problems encountered during productions of high quantities of composite parts with the RTM system are related to wear on the mould, which leads to using metal moulds for long runs and to control of the temperature between the various manufactures, which proves difficult and very expensive in terms of energy considering the thermal inertia of the materials used for the manufacture of the moulds, whether it be a case of metals or resins. The wear is due partly to the maintenance of the mould, comprising preparation and cleaning phases causing abrasion and chemical attack on the surfaces. The wear is due also to the rubbing of the reinforcements of the mould during the closure of the chamber in which the matrix is to be injected. To prevent this wear adopting excessive proportions, apparatus especially designed to form the reinforcements is used before introducing these reinforcements into the moulds. In addition, for an optimum quality of the manufacture of a thermosetting composite, it is essential to control the temperature cycle during polymerisation in order to optimise the quality of the composite obtained. Metal or resin moulds require a great deal of energy to be cooled at the end of their cycle and their thermal inertia causes very long times for returning to an optimum temperature. This drawback automatically causes a drop in quality during a production of large quantities of composite parts with the traditional methods and long manufacturing times. In the apparatus described in the patent, the composite (C) is not directly in contact with the mould (A) and the choice of membranes causing little abrasion during shaping makes it possible to achieve a saving in time, by avoiding performing, and preservation of the mould (A), which is not subject to the attacks represented by cleaning and the application of a chemical mould stripper to its surfaces as well as the abrasion generated by friction with materials as hard and abrasive as glass, aramid or carbon fibre constituting the reinforcements of the composite parts. As the problem of adhesion of the matrix to the mould is not posed, the choice of materials or combinations of materials possible for manufacturing the mould is much less limited with the method described in these presents and with the known methods. Ceramics are materials that may be porous or microporous, available in the form of cement or bricks, machinable with perfectly controlled tools for manufacturing shaped parts and under compression resisting very high pressures. Their use is therefore perfectly suited to the manufacture of moulds for the apparatus described. Associated with a reinforcement (H) having high tensile strength and low elongation as described above, these ceramics afford decisive advantages for mass production carried out with the apparatus described in this patent. The first quality is the possibility of obtaining an optimum surface finish by keeping a microporosity of the ceramic propitious to the discharge of the volume of fluid trapped between the membrane (G) and the mould (A). The second quality is a surface hardness that limits the wear on the mould (A) considering moreover that it is not subjected to the forces due to contact with the membrane (G) during the manufacturing cycle. The third quality is the thermal insulation capacity of ceramics, which makes it possible to control the temperature of the composites during the polymerisation of the matrix solely by means of the temperature of the fluids contained in the chambers (D, E), the variations in temperature of the mould (A) having very little influence on the process. It is in this way possible to implement each manufacturing phase at a temperature caused mainly by the effect of the fluids used in the apparatus without any appreciable effect of the temperature rise or fall of the volume of the mould (A), as is the case with metal or resin moulds used in the known methods. Ceramics being a thermal insulator of very high quality, they protect the bottom reinforcement (H) from the transmission of heat, which provides the tensile strength of the mould (A) when the pressure increases. Because of this the association of materials such as composites, matrix and reinforcement and more particularly epoxy or phenolic resin and carbon fibre is possible instead of a metal reinforcement even in the case of the use of fluids at very high temperature for the purpose of accelerating the cycles of polymerisation of the matrix of the composite. The epoxy or phenolic resins binding the carbon fibres lose their mechanical qualities beyond a certain temperature lying generally between 80° and 200° according to the resin and it is possible to work continuously with a ceramic mould reinforced on its bottom face with a reinforcement without the bottom face rising in temperature above the strength limits of the resins cited. Because of the thermal insulation offered by the ceramic it is possible to control the deformations due to the differences in coefficient of expansion of the materials constituting the mould (A). Either the thermal insulation provided by the ceramic is sufficient for the differences in temperature during the cycle to cause negligible deformation with respect to the limits fixed by the specification of the composite and mould; or it is necessary, considering the use during the production phases of fluids employed at very high temperature or at very low temperature, including the case of thermal shocks related to the succession, within a very brief period of time, of very hot and very cold fluids in the chambers (D, E) of the apparatus, to install a device in the construction of the mould (A) that makes it possible, with suitable equipment and peripheries, to heat or refrigerate certain areas of the mould (A). The thermal insulation provided by the ceramic will considerably reduce the need for thermal regulation in the mould (A) in order to obtain the expected result with regard to control of the stability of shape of the mould (A).

Porous or microporous ceramic materials have excellent compressive strength at the pressures used in industry for forming and compacting composites. They withstand the bending, torsion and traction forces less well. As we have seen above, it is possible to associate them with reinforcements to which they are bonded and which provide the tensile strength of the mould (A) and with the peripheral chassis (B), the rigidity of which provides the control of torsion, the pressure in the bottom chamber (D) or the support of the plate (FIG. 4) (B) controlling the bending of the mould (A).

Another solution consists of integrating the porous mould, at least on the surface on which the composite (C) is formed, in the apparatus, equipped with channels and peripherals for discharging the fluids to the outside of the chamber of the apparatus (FIG. 8 to FIG. 10), between the membrane (G) and either a plate (B) (FIG. 8) or a rigid partition the form of which is controlled by a fluid (Y FIG. 9), or a flexible membrane (Z) (FIG. 10) delimiting a chamber in which it is possible to control the pressure of a fluid. The form of a peripheral part of the mould is such that, when the apparatus is at its service pressure, the mould receives, on the whole of its external surface, an isobaric pressure applied by the membrane (G) on its top face and the membrane (Z) (FIG. 10) on its bottom face or an isobaric pressure on its top face balanced by the resistance of the plate (B) (FIG. 8) or of the partition (Y) (FIG. 9) on its bottom face.

The invention claimed is:

1. An apparatus to form and compact a composite provided with a matrix, said apparatus comprising:
   first and second flexible stretchable membranes able to contain the composite and to hold the composite on a forming mould during polymerisation of the matrix, the mould comprising one or more materials resistant under compression to a pressure applied by the first membrane to the composite,
   a chassis holding the first and second membranes and the mould at their periphery and relative to each other,
   a top chamber and a device configured for varying a first pressure of fluid in the top chamber,
   a bottom chamber and device configured for regulating a second pressure of the fluid in the bottom chamber so as to vary a third pressure of fluid on a bottom surface of the mould and consequently to control a deformation level of the mould while the first pressure of the fluid varies in the top chamber, and the mould is held at the periphery thereof relative to the chassis,
   a volume of the mould made from porous or microporous material, said volume extending along a dimension in a thickness of the mould from a surface on which the composite is able to be conformed to the bottom surface of the mould, configured to eliminate any fluid contained between the mould and the second membrane by an isobaric pressure gradient when the composite is formed on the surface of the mould, a countermould, wherein a volume of the countermould is made from porous or microporous material, said volume extending along a dimension in a thickness of the countermould, and
   a reinforcement held at the periphery by the chassis having a tensile strength such that elongation when the fluids are pressurised in the apparatus is in all cases less than a tensile strength limit of material or materials constituting a volume of the mould on which the composite is able to be formed when the apparatus is at service temperature and pressure range, wherein the reinforcement is integrated in the bottom surface of the mould and is configured to provide the tensile strength of the mould and comprises a matrix and carbon fibre composite.

2. The apparatus according to claim 1, wherein at least one of two membranes is a material adherent to the composite so as to form a surface coating of a final part by adhesion to the matrix during polymerisation thereof.

3. The apparatus according to claim 1, further comprising channels provided at a periphery of the membranes, the channels allowing, by means of suitable peripherals, control of putting under complete or relative vacuum of an area between the membranes containing the composite, control of an injection of the matrix of the composite between the membranes and control of a drainage towards an outside of the volume lying between the membranes of any excess of the matrix through the fact of a pressure gradient between the pressure in the chambers in the apparatus and the pressure prevailing in an area towards which the matrix is extracted.

4. The apparatus according to claim 1, further comprising areas in the mould delimited by sealing joints on the surface of the mould, opposite or not separate pouches in a top and bottom pressing chambers, so that the pressure of a fluid can be managed separately in different chambers lying between the areas of the mould thus delimited and the second membrane containing the composite and situated in contact with the mould while keeping a possibility of controlling a deformation of the mould on which the composite is conformed relative to the chassis of the apparatus by having an influence on a pressure of fluids in the pouches in the bottom and top chambers.

5. The apparatus according to claim 1, wherein at least the surface of the mould on which the composite is formed is made from porous or microporous ceramic.

6. The apparatus according to claim 1, in which the mould comprises a ceramic coating for thermal insulation of a forming surface of the composite so as to reduce a thermal amplitude in a mass of the mould allowing utilization of materials having different coefficients of expansion for manufacture of the mould without consequences due to a temperature of the fluids used in the apparatus.

7. The apparatus according to claim 1, further comprising equipment configured to heat or refrigerate the mould so as to control expansion of the materials constituting the mould independently of temperatures of the fluids used in the apparatus.

8. The apparatus according to claim 1, wherein the mould, porous at least on the surface on which the composite is formed, is installed in the apparatus, equipped with channels and peripherals for discharging fluids to an outside of the chamber of the apparatus, between the membrane and either a plate or a rigid partition, the shape of which is controlled by a fluid, or a flexible membrane delimiting a chamber in which it is possible to control the pressure of the fluid; a shape of the peripheral part of the mould is such that, when the apparatus is at service pressure, the mould receives the isobaric pressure applied by the membrane on a top face and the membrane on a bottom face or an isobaric pressure on the top face balanced by a resistance of the plate or of a partition on the bottom face.

9. The apparatus according to claim 2, further comprising channels provided at the periphery of the membranes, the channels allowing, by means of suitable peripherals, control of putting under complete or relative vacuum of an area between the membranes containing the composite, control of injection of the matrix of the composite between the membranes and control of a drainage towards the outside of the volume lying between the membranes of any excess of matrix through the fact of a pressure gradient between the pressure in the chambers in the apparatus and the pressure prevailing in the area towards which the matrix is extracted.

10. The apparatus according to claim 2, further comprising areas in the mould delimited by sealing joints on the surface of the mould, opposite or not separate pouches in the top and bottom pressing chambers, so that the pressure of a fluid can be managed separately in the different chambers lying between the areas of the mould thus delimited and the bottom membrane containing the composite and situated in contact with the mould while keeping a possibility of controlling the deformation of the mould on which the composite is conformed relative to the chassis of the apparatus by having an influence on the pressure of fluids in pouches in the bottom and top chambers.

11. The apparatus according to claim 1, wherein the volume of the countermould comprises a top surface facing the top chamber and a bottom surface facing the first membrane.

12. An apparatus to form and compact a composite provided with a matrix, said apparatus comprising:
   a forming mold,
   first and second flexible stretchable membranes able to contain the composite and to hold the composite on the forming mould during polymerisation of the matrix, the forming mould comprising one or more materials resistant under compression to a pressure applied by the first membrane to the composite,
a chassis holding the first and second membranes and the mould at a periphery of the first and second membranes and the mold and relative to each other,
a top chamber and a device configured for varying a first pressure of fluid in the top chamber, and
a bottom chamber and device configured for regulating a second pressure of the fluid in the bottom chamber so as to vary a third pressure of the fluid on a bottom surface of the mould and consequently to control a deformation level of the mould while the first pressure of the fluid varies in the top chamber,
wherein the forming mould is held at a periphery thereof relative to the chassis and wherein a volume of the forming mould is made from porous or microporous material, said volume extending along a dimension in a thickness of the forming mould from a top surface on which the composite is able to be conformed to the bottom surface of the forming mould, configured to eliminate any fluid contained between the forming mould and the second membrane by an isobaric pressure gradient when the composite is formed on the surface of the forming mould, a countermould, wherein a volume of the countermould is made from porous or microporous material, said volume extending along a dimension in a thickness of the countermould, and a reinforcement held at the periphery by the chassis having a tensile strength such that elongation when the fluids are pressurised in the apparatus is in all cases less than a tensile strength limit of material or materials constituting a volume of the mould on which the composite is able to be formed when the apparatus is at service temperature and pressure range, wherein the reinforcement is integrated in the bottom surface of the mould and is configured to provide the tensile strength of the mould and comprises a matrix and carbon fiber composite.

* * * * *